(12) United States Patent
Chang et al.

(10) Patent No.: US 8,254,014 B1
(45) Date of Patent: Aug. 28, 2012

(54) ADAPTIVE OPTICS SYSTEMS USING PIXILATED MICROELECTROMECHANICAL SYSTEMS (MEMS)

(75) Inventors: Peter H. Chang, Cupertino, CA (US);
Sami J. Saab, San Francisco, CA (US);
Natarajan Shankar, San Jose, CA (US);
John A. Koontz, Cupertino, CA (US);
Mark S. Ptak, Livermore, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 192 days.

(21) Appl. No.: 12/817,096

(22) Filed: Jun. 16, 2010

Related U.S. Application Data

(62) Division of application No. 12/258,262, filed on Oct. 24, 2008, now Pat. No. 7,764,417.

(51) Int. Cl.
*G02F 1/01* (2006.01)
*G02B 27/14* (2006.01)

(52) U.S. Cl. ........................................ 359/279; 359/629

(58) Field of Classification Search .................. 359/279, 359/290, 291, 298, 316
See application file for complete search history.

(56) References Cited

U.S. PATENT DOCUMENTS

| 5,051,571 | A | * | 9/1991 | Brown et al. | ............... | 250/201.9 |
| 6,937,381 | B2 | | 8/2005 | Kitamura et al. | | |
| 2006/0022115 | A1 | * | 2/2006 | Byren | ........................ | 250/201.9 |

* cited by examiner

*Primary Examiner* — William Choi
(74) *Attorney, Agent, or Firm* — McDermott Will & Emery LLP

(57) ABSTRACT

An adaptive optics system is provided, comprising a spatial light modulator configured to modulate an incoming beam with an aberrated wavefront, a beamsplitter configured to receive the modulated beam from the spatial light modulator and to divide the modulated beam into a measurement beam and a reference beam, a spatial filter configured to spatially filter the reference beam, and to interfere the spatially filtered reference beam with the measurement beam to form an interferogram, an imaging device configured to capture an image of the interferogram, and a processor configured to determine the aberrated wavefront and to provide control signals to the spatial light modulator to mitigate aberrations in the aberrated wavefront.

9 Claims, 4 Drawing Sheets

ADAPTIVE OPTICS SYSTEMS USING PIXILATED MICROELECTROMECHANICAL SYSTEMS (MEMS)

CROSS-REFERENCES TO RELATED APPLICATIONS

This application is a divisional application of U.S. patent application Ser. No. 12/258,262, filed on Oct. 24, 2008, which is hereby incorporated by reference in its entirety for all purposes.

STATEMENT REGARDING FEDERALLY SPONSORED RESEARCH OR DEVELOPMENT

Not applicable.

FIELD OF THE INVENTION

The present invention generally relates to adaptive optics systems and, in particular, relates to adaptive optics systems using pixilated microelectromechanical systems (MEMS).

BACKGROUND OF THE INVENTION

Adaptive optics ("AO") are used to control deformable mirrors to compensate for phase aberrations introduced, for example, by the turbulence in the Earth's atmosphere or by the optical elements between a distant object and its local sensor. In an adaptive optics system where a deformable mirror ("DM") is used, the wavefront correction capability of the system can often be restricted by the limited stroke of the mirror. In specific cases where a DM is used to correct the tip/tilt, or to direct the beam direction, the range of the tip/tilt angle achievable is extremely small. Large-stroke deformable mirrors are available, but are only able to operate at slower speeds (i.e., with lower bandwidth).

SUMMARY OF THE INVENTION

Various embodiments of the present invention solve the foregoing problem by providing an adaptive optics system with a spatial light modulator ("SLM") for wavefront correction. The system is capable of correcting much larger magnitude tip/tilt and higher order aberrations. Innovative algorithms are used to control the SLM to reduce transient effects (arising from the motion of individual actuators) and to increase the bandwidth at which the system can be operated.

According to one embodiment of the present invention, an adaptive optics system comprises a spatial light modulator configured to modulate an incoming beam with an aberrated wavefront, a beamsplitter configured to receive the modulated beam from the spatial light modulator and to divide the modulated beam into a measurement beam and a reference beam, a spatial filter configured to spatially filter the reference beam, and to interfere the spatially filtered reference beam with the measurement beam to form an interferogram, an imaging device configured to capture an image of the interferogram, and a processor configured to determine the aberrated wavefront and to provide control signals to the spatial light modulator to mitigate aberrations in the aberrated wavefront.

According to another embodiment of the present invention, an adaptive optics system comprises a spatial light modulator configured to reflect an aberrated wavefront onto a Shack Hartmann wavefront sensor, the Shack Hartmann wavefront sensor configured to receive the aberrated wavefront and to form an output array on an image sensor, the image sensor configured to capture an image of the output array, and a processor configured to determine the aberrated wavefront and to provide control signals to the spatial light modulator to mitigate aberrations in the aberrated wavefront.

According to another embodiment of the present invention, a method for performing adaptive optics correction comprises the steps of measuring a wavefront to determine a plurality of phase aberrations thereof, calculating a plurality of phase adjustments corresponding to the plurality of phase aberrations of the wavefront, and providing control signals to a spatial light modulator with a plurality of actuators to actuate each actuator by a corresponding one of the plurality of phase adjustments.

It is to be understood that both the foregoing summary of the invention and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitute a part of this specification, illustrate embodiments of the invention and together with the description serve to explain the principles of the invention. In the drawings.

DETAILED DESCRIPTION OF THE INVENTION

In the following detailed description, numerous specific details are set forth to provide a full understanding of the present invention. It will be apparent, however, to one ordinarily skilled in the art that the present invention may be practiced without some of these specific details. In other instances, well-known structures and techniques have not been shown in detail to avoid unnecessarily obscuring the present invention.

A pixilated MEMS spatial light modulator comprises a plurality of actuators, each of which can be actuated independently, without affecting neighboring actuators. Accordingly, such a modulator can be utilized to perform precise wavefront correction, and can moreover be used to provide tip/tilt or beam direction with large angles. This is due in part to the fact that when a wavefront or a portion thereof is shifted by $2\pi$ or a multiple thereof, the wavefront remains unchanged (for monochromatic light). Accordingly, even when the overall wavefront deviates from the desired wavefront by many times that of $2\pi$, each actuator only needs to move within its range of movement, which may be no more than $2\pi$.

Figure 1:
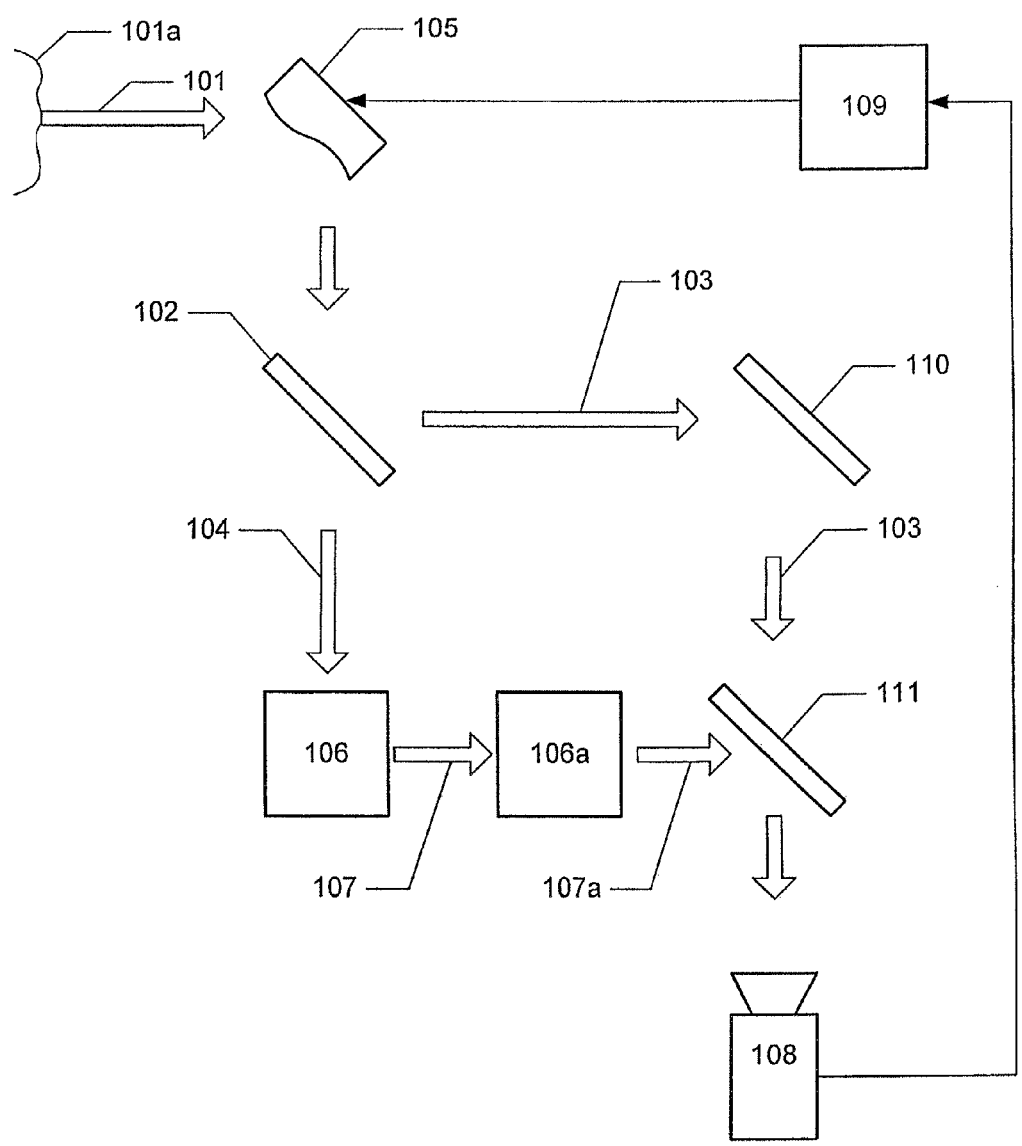
FIG. 1 illustrates an adaptive optics system in accordance with one embodiment of the present invention.

FIG. 1 illustrates an adaptive optics system according to one embodiment of the present invention. The adaptive optics system includes a spatial light modulator ("SLM"), which mitigates the aberrations of incoming beam 101 and redirects it to a beamsplitter 102. Beamsplitter 102 splits the redirected beam into two substantially identical beams 103 and 104. Beam 104 is spatially filtered by a single mode fiber 106 to produce a reference beam 107 with a flat phase. In accordance with one aspect of the present invention, single mode fiber 106 has a geometry that permits only a lowest order mode (i.e., the lowest order solution to the wave equation that satisfies the boundary conditions) to travel through the fiber. All other higher modes either radiate or dissipate at the boundary of the single mode fiber. Reference beam 107 passes through a phase shifter 106a, which produces a phase-shifted reference beam 107a. Phase-shifted reference beam 107a is combined with beam 103, which is redirected by mirror 110 to beam combiner 111. The combined beam 112 is directed by beam combiner 111 to an image plane of imaging device 108.

By interfering beam 103 with phase-shifted reference beam 107a, an interferogram is formed in imaging device 108, which captures an image of the interferogram and provides it to processor 109. In accordance with various aspects of the present invention, imaging device 108 may be a charge-coupled device ("CCD") (e.g., an InGaAs CCD), a CMOS, or any other imaging device known to those of skill in the art. Processor 109 is configured to reconstruct the wavefront of incoming beam 101 based upon the captured interferogram.

SLM 105 includes a plurality of independently adjustable actuators. Each actuator corresponds to one or more pixels of imaging device 108. According to one aspect of the present invention, a ratio of pixels of imaging device 108 to actuators of SLM 105 is greater than 1:1. For each pixel or group of pixels corresponding to an actuator of SLM 105, processor 109 calculates a phase aberration of the wavefront. This phase aberration is then used to calculate a corresponding phase adjustment for the actuator to perform to mitigate the detected aberration. According to one exemplary embodiment, the phase adjustment may be a modulus of the detected phase aberration divided by $2\pi$.

In the adaptive optics system of the present exemplary embodiment, the MEMS actuators are moved to mitigate phase aberrations in the incoming wavefront. As such, the average phase value of the overall wavefront is not critical. What is more important, rather, is the relative phase of the wavefront at one spatial point versus the phase at other points. For example, if the phase of the wavefront at a given pixel or group of pixels is determined to have a phase aberration of $3\pi$, processor 109 may calculate that a phase correction of $\pi$ ($3\pi-2\pi$) should be applied. Such a correction maintains the appropriate relative phase difference between the corrected region and adjacent regions the same as if an adjustment of $3\pi$ were provided (which adjustment might be beyond the operable range of the actuator).

According to one additional aspect of the present invention, to minimize the movement of the actuators, a dynamic control of the value of the average wavefront is applied. This leads to a reduced transient effect and improved bandwidth of the system. For example, to minimize the number of actuators that must be moved from one extreme of position to the other, the controller may be configured to maintain the average position of all of the actuators at about the mid-stroke position thereof. Expressed another way, the mitigated wavefront can be phased in one direction or another in order to keep the position of the actuators which require the most adjustment from reaching an utmost travel limit thereof. By maintaining a desired bias position of all of the actuators at an average middle position thereof (i.e., at a point farthest from their discontinuous operating points), the number of actuators which need to be adjusted from one extreme position to the other can be minimized, improving the overall performance of the system.

In accordance with one exemplary embodiment, in order to calculate a phase aberration corresponding to a given pixel or group of pixels, processor 109 may be configured as follows.

First, let $A_S e^{-j\phi_S}$=Signal Amplitude and $A_R e^{-j\phi_R}$=Reference Amplitude, such that $$I_S = \text{Signal Intensity} = |\text{Signal Amplitude}|^2 = A_S^2, \text{ and} \quad (1)$$

$$I_R = \text{Reference Intensity} = |\text{Reference Amplitude}|^2 = A_R^2. \quad (2)$$

Accordingly, the interference amplitude and intensity can be calculated as follows:

$$A = \text{Interference Amplitude} = A_S e^{-j\phi_S} + A_R e^{-j\phi_R}, \text{ and} \quad (3)$$

$$I = \text{Interference Intensity} = |A|^2 = I_S + I_R + 2\sqrt{I_S I_R} \cos(\phi_S - \phi_R), \quad (4)$$

where $\phi_S$=Signal Phase and $\phi_R$=Reference Phase.

Accordingly, the interference intensity can also be described as $$I = I_{DC} + I_{AC} \cos(\Delta\phi), \quad (5)$$

where $I_{DC} \equiv I_S + I_R$, $I_{AC} \equiv 2\sqrt{I_S I_R}$, $\Delta\phi \equiv \phi_S - \phi_R$.

Processor 109 may be configured to induce phase shifts through phase shifter_in reference beam 107 to generate four intensity measurements, where $\theta_t$=Induced Phase Shift in Reference Beam:

$$I_t = I_{DC} + I_{AC} \cos(\Delta\phi + \theta_t), \quad (6)$$

such that $$I_1 = I_{DC} + I_{AC} \cos(\Delta\phi)$$

$$I_2 = I_{DC} - I_{AC} \sin(\Delta\phi)$$

$$I_3 = I_{DC} - I_{AC} \cos(\Delta\phi)$$

$$I_4 = I_{DC} + I_{AC} \sin(\Delta\phi) \quad (7)$$

where $\theta_t = \{0 \ \pi/2 \ \pi \ 3\pi/2\}$, $t = \{1\ 2\ 3\ 4\}$.

Processor 109 may then be configured to generate subaperture phase error vectors with following components:

x component=$I_1 - I_3$
y component=$I_4 - I_2$

Processor 109 may then normalize each vector to unity length and sum the vectors to generate a bias vector. Next, processor 109 may generate a reflection matrix to reflect the bias vector onto the x axis with zero radians, and may reflect the subaperture phase error vectors with the same matrix to remove the bias and generate subaperture phase correction vectors x' and y'. Processor 109 may calculate an arc tan of the resulting phase correction vectors to generate scalar values in radians:

$$\Delta\varphi = \arctan\left(\frac{y'}{x'}\right). \quad (8)$$

Next, processor 109 may pass the phase correction values into an integrator to update the phase position placement of the MEMS actuators. According to one aspect, processor 109 may also adjust the gain and other filter settings to obtain optimal performance with respect to dynamics and noise in system. For example, a first order infinite impulse response ("IIR") filter with a gain of 0.8 and no second term feed forward path may be utilized, in accordance with one exemplary aspect of the present invention.

Next, processor 109 may be configured to calculate the bias from all integrator outputs and to generate a difference from the desired bias. According to one aspect, the desired bias should be set to the actuator mid-phase position level (i.e., furthest away from all discontinuous operating points). The difference is then subtracted from all integrator outputs.

Processor 109 may be further configured to check each actuator's phase position and to determine if the value is out of range of actuator's voltage limits. If out of range, processor 109 may pull the out-of-range actuator's phase position back into its operating range by applying an appropriate $2\pi$ shift.

Before moving an actuator, processor 109 may be configured to determine a least distance necessary to adjust the phase position of the actuator, by "wrapping" the movement thereof. In this regard, processor 109 may be configured to check each actuators phase position and to determine if that value is greater than $\pi$ away from a previous phase position. If so, the actuator's phase position can be reduced by applying an appropriate $2\pi$ shift.

Once processor 109 has determined the appropriate actuator phase positions, it applies mapping to translate the actuator phase positions into actuator voltage levels and sends corresponding command signals to SLM 105. According to one aspect of the present invention, a linear and square term relationship may exist between the actuator voltage level and the desired actuator phase position.

Figure 2:
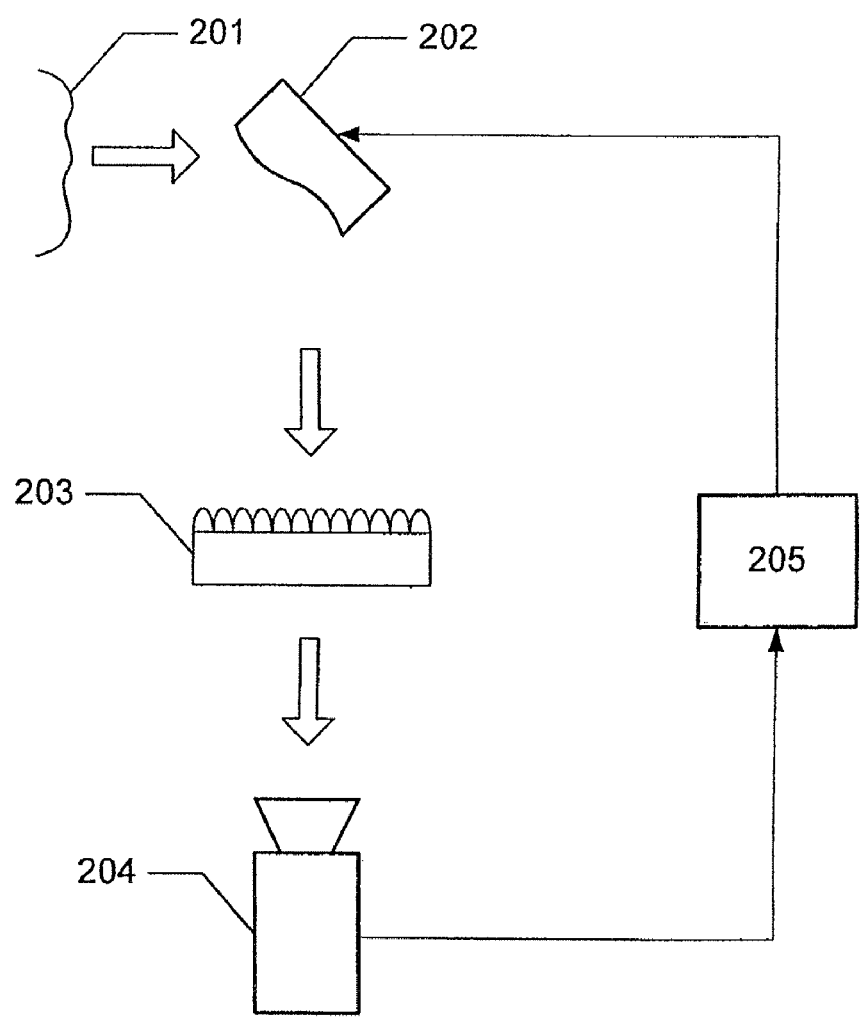
FIG. 2 illustrates an adaptive optics system in accordance with another embodiment of the present invention.

FIG. 2 illustrates an adaptive optics system in accordance with another embodiment of the present invention, in which a Shack-Hartmann wavefront sensor is combined with a spatial light modulator. The adaptive optics system includes a spatial light modulator ("SLM") 202, which reflects an incoming beam 201 with an aberrated wavefront onto a Shack-Hartmann wavefront sensor 203. Shack-Hartmann wavefront sensor 203 forms an output array, an image of which is captured by imaging device 204, which provides the image to processor 205. In accordance with various aspects of the present invention, imaging device 204 may be a CCD, a CMOS, or any other imaging device known to those of skill in the art. Processor 205 is configured to reconstruct the wavefront of incoming beam 201 based upon the captured output array.

SLM 202 includes a plurality of independently adjustable actuators. Each actuator corresponds to multiple pixels of imaging device 204. According to one aspect of the present invention, a ratio of pixels of imaging device 204 to actuators of SLM 202 is greater than 4:1. For each group of pixels corresponding to an actuator of SLM 202, processor 205 calculates a phase aberration of the wavefront. This phase aberration is then used to calculate a corresponding phase adjustment for the actuator to perform to mitigate the detected aberration. According to one exemplary embodiment, the phase adjustment may be a modulus of the detected phase aberration divided by $2\pi$.

In accordance with yet another aspect of the present invention, an adaptive optics system may employ a position sensor or quad-cell to detect simple wavefront aberrations. Such a system may be used to correct simple wavefront aberrations addressable by tipping or tilting the SLM. For example, a position sensor or quad-cell may be substituted for the Shack-Hartmann wavefront sensor 203 and the imaging device 204 in the exemplary adaptive optics system of FIG. 2.

Figure 3:
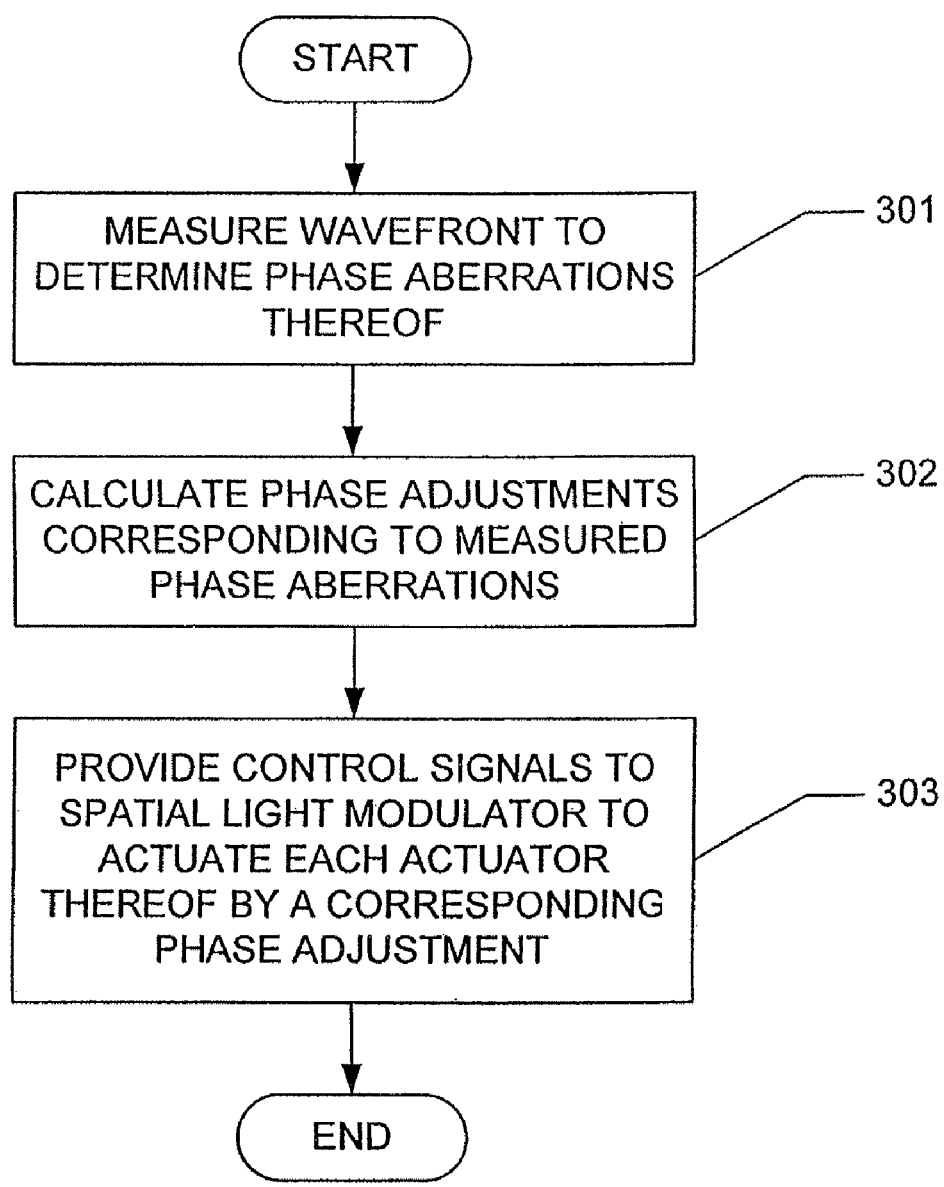
FIG. 3 is a flow chart illustrating a method for performing correction of phase aberrations in accordance with one embodiment of the present invention.

FIG. 3 is a flowchart illustrating a method of performing correction of phase aberrations in accordance with one aspect of the present invention. The method begins in step 301, in which a wavefront is measured to determine phase aberrations thereof. The wavefront may be measured with any one of a number of wavefront sensors such as, for example, a self-referencing wavefront sensor, a Shack-Hartmann wavefront sensor, or the like. In step 302, a plurality of phase adjustments corresponding to the measured phase aberrations are calculated by a processor. In step 303, a plurality of control signals corresponding to the measured phase aberrations are provided to a spatial light modulator to mitigate aberrations in the wavefront. According to one exemplary embodiment, the phase adjustment may be a modulus of the detected phase aberration divided by $2\pi$.

Figure 4:
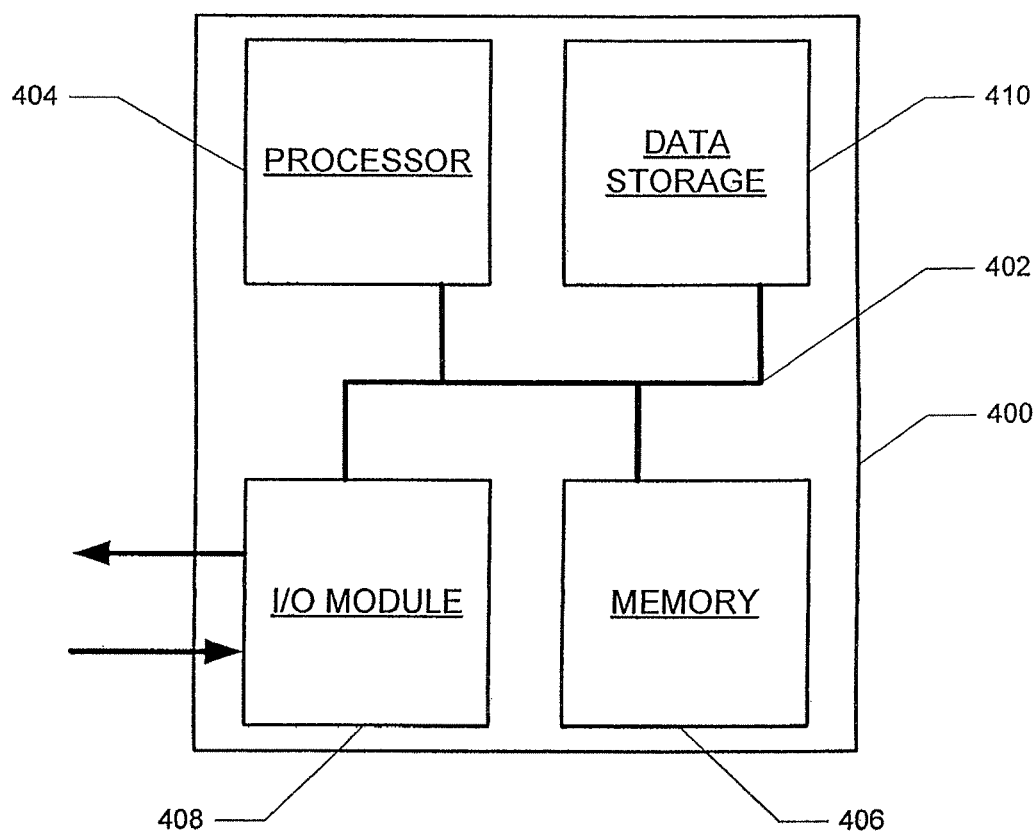
FIG. 4 is a block diagram illustrating a computer system upon which one embodiment of the present invention may be implemented.

FIG. 4 is a block diagram that illustrates a computer system 400 upon which an embodiment of the present invention may be implemented. Computer system 400 includes a bus 402 or other communication mechanism for communicating information, and a processor 404 coupled with bus 402 for processing information. Computer system 400 also includes a memory 406, such as a random access memory ("RAM") or other dynamic storage device, coupled to bus 402 for storing information and instructions to be executed by processor 404. Memory 406 may also be used for storing temporary variables or other intermediate information during execution of instructions by processor 404. Computer system 400 further includes a data storage device 410, such as a magnetic disk or optical disk, coupled to bus 402 for storing information and instructions.

Computer system 400 may be coupled via I/O module 408 to a display device (not illustrated), such as a cathode ray tube ("CRT") or liquid crystal display ("LCD") for displaying information to a computer user. An input device, such as, for example, a keyboard or a mouse may also be coupled to computer system 400 via I/O module 408 for communicating information and command selections to processor 404.

According to one embodiment of the present invention, adaptive optics correction is performed by a computer system 400 in response to processor 404 executing one or more sequences of one or more instructions contained in memory 406. Such instructions may be read into memory 406 from another machine-readable medium, such as data storage device 410. Execution of the sequences of instructions contained in main memory 406 causes processor 404 to perform the process steps described herein. One or more processors in a multi-processing arrangement may also be employed to execute the sequences of instructions contained in memory 406. In alternative embodiments, hard-wired circuitry may be used in place of or in combination with software instructions to implement various embodiments of the present invention. Thus, embodiments of the present invention are not limited to any specific combination of hardware circuitry and software.

The term "machine-readable medium" as used herein refers to any medium that participates in providing instructions to processor 404 for execution. Such a medium may take many forms, including, but not limited to, non-volatile media, volatile media, and transmission media. Non-volatile media include, for example, optical or magnetic disks, such as data storage device 410. Volatile media include dynamic memory, such as memory 406. Transmission media include coaxial cables, copper wire, and fiber optics, including the wires that comprise bus 402. Transmission media can also take the form of acoustic or light waves, such as those generated during radio frequency and infrared data communications. Common forms of machine-readable media include, for example, floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH EPROM, any other memory chip or cartridge, a carrier wave, or any other medium from which a computer can read.

The description of the invention is provided to enable any person skilled in the art to practice the various embodiments described herein. While the present invention has been particularly described with reference to the various figures and embodiments, it should be understood that these are for illustration purposes only and should not be taken as limiting the scope of the invention.

There may be many other ways to implement the invention. Various functions and elements described herein may be partitioned differently from those shown without departing from the spirit and scope of the invention. Various modifications to these embodiments will be readily apparent to those skilled in the art, and generic principles defined herein may be applied to other embodiments. Thus, many changes and modifications may be made to the invention, by one having ordinary skill in the art, without departing from the spirit and scope of the invention.

A reference to an element in the singular is not intended to mean "one and only one" unless specifically stated, but rather "one or more." The term "some" refers to one or more. Underlined and/or italicized headings and subheadings are used for convenience only, do not limit the invention, and are not referred to in connection with the interpretation of the description of the invention. All structural and functional equivalents to the elements of the various embodiments of the invention described throughout this disclosure that are known or later come to be known to those of ordinary skill in the art are expressly incorporated herein by reference and intended to be encompassed by the invention. Moreover, nothing disclosed herein is intended to be dedicated to the public regardless of whether such disclosure is explicitly recited in the above description.

What is claimed is:

1. An adaptive optics system, comprising:
a spatial light modulator comprising a pixilated microelectromechanical system, the spatial light modulator configured to reflect an aberrated wavefront onto a wavefront sensor;
the wavefront sensor configured to receive the aberrated wavefront and to form an output array on an imaging device;
the imaging device configured to capture an image of the output array; and
a processor configured to determine the aberrated wavefront and to provide control signals to the spatial light modulator to mitigate aberrations in the aberrated wavefront,
wherein the ratio of pixels of the imaging device to actuators of the pixilated microelectromechanical system is greater than 1:1.

2. The adaptive optics system of claim 1, wherein the wavefront sensor is a Shack Hartmann wavefront sensor.

3. The adaptive optics system of claim 1, wherein the wavefront sensor and the imaging device comprise one of a position sensor or a quad cell.

4. The adaptive optics system of claim 1, wherein the imaging device comprises an InGaAs charge-coupled device ("CCD").

5. The adaptive optics system of claim 1, wherein the processor is configured to minimize a number of actuators requiring a phase adjustment of greater than $\pi$.

6. An adaptive optics system, comprising:
a spatial light modulator configured to reflect an aberrated wavefront onto a wavefront sensor;
the wavefront sensor configured to receive the aberrated wavefront and to form an output array on an imaging device;
the imaging device configured to capture an image of the output array; and
a processor configured to determine the aberrated wavefront and to provide control signals to the spatial light modulator to mitigate aberrations in the aberrated wavefront,
wherein the processor is configured to adjust each actuator of the spatial light modulator by a modulus of a detected phase aberration for a corresponding pixel of the imaging device divided by $2\pi$.

7. An adaptive optics system, comprising:
a spatial light modulator configured to reflect an aberrated wavefront onto a wavefront sensor;
the wavefront sensor configured to receive the aberrated wavefront and to form an output array on an imaging device;
the imaging device configured to capture an image of the output array; and
a processor configured to determine the aberrated wavefront and to provide control signals to the spatial light modulator to mitigate aberrations in the aberrated wavefront,
wherein the processor is configured to adjust actuators of the spatial light modulator to positions relative to a farthest position from discontinuous operating points of the actuators.

8. The method of claim 7, wherein the calculating the plurality of phase adjustments comprises calculating, for each actuator, a modulus of a corresponding phase aberration divided by $2\pi$.

9. The method of claim 7, wherein the calculating the plurality of phase adjustments comprises minimizing a number of actuators requiring a phase adjustment of greater than $\pi$.

* * * * *